United States Patent [19]

Oyanagi et al.

[11] Patent Number: 6,073,117

[45] Date of Patent: Jun. 6, 2000

[54] MUTUAL CREDIT SERVER APPARATUS AND A DISTRIBUTED MUTUAL CREDIT SYSTEM

[75] Inventors: Shigeru Oyanagi; Mitsuru Kakimoto, both of Kanagawa-ken; Akihiko Nakase, Tokyo, all of Japan

[73] Assignee: Kabushiki Kaisha Toshiba, Kawasaki, Japan

[21] Appl. No.: 09/042,081

[22] Filed: Mar. 13, 1998

[30] Foreign Application Priority Data

Mar. 18, 1997 [JP] Japan ............................. P09-064470

[51] Int. Cl.[7] ........................................... G06F 17/60
[52] U.S. Cl. .......................... 705/38; 705/10; 705/11; 705/26
[58] Field of Search ...................... 705/38, 10, 11, 705/26

[56] References Cited

U.S. PATENT DOCUMENTS

| | | | |
|---|---|---|---|
| 5,732,400 | 3/1998 | Mandler et al. | 705/26 |
| 5,794,219 | 8/1998 | Brown | 705/37 |
| 5,797,133 | 8/1998 | Jones et al. | 705/38 |
| 5,842,178 | 11/1998 | Giovannoli | 705/26 |
| 5,845,265 | 12/1998 | Woolston | 705/37 |
| 5,926,794 | 7/1999 | Fethe | 705/11 |

OTHER PUBLICATIONS

M2 Presswire, "EBAY: eBay's AuctionWeb tops one million bids; leading online auction service announces record year", Dec. 1996.

U.S. Company Profile, eBay Inc., 1998.

Bloom, David "Auction.com; Internet gavel Falls With a Click," the Daily News of Los Angeles, p. 13 L.A. Life, Jan. 27, 1999.

Jessup, Leonard M. "Enterprise–wide brainstorming on the web: The case of Experts Exchange", Jul. 21, 1997.

*Primary Examiner*—Emanuel Todd Voeltz
*Assistant Examiner*—William R. McCarty
*Attorney, Agent, or Firm*—Finnegan, Henderson, Farabow, Garrett & Dunner, L.L.P.

[57] ABSTRACT

A mutual credit server apparatus sends credit information about a seller to an inquiring buyer on a computer. Stored is a direct confidence degree about a seller from the point of view of each of a plurality of buyers. The direct confidence degree is determined by each buyer based on direct trade history. Also stored is a buyer confidence degree about each of the plurality of buyers from the point of view of each buyer. The buyer confidence degree is determined by each buyer based upon trade information from the other buyers. When a confidence inquiry is made about a seller by a buyer, a processing section calculates a total confidence degree about the seller and calculates a buyer confidence degree about each of the other buyers, each calculation being made from the viewpoint of the inquiring buyer.

15 Claims, 9 Drawing Sheets

| DESTINATION ADDRESS (SERVER) | SOURCE ADDRESS (PARTICULAR CLIENT) | BUYER ID | NOTICE CODE OF DATA | DATA |

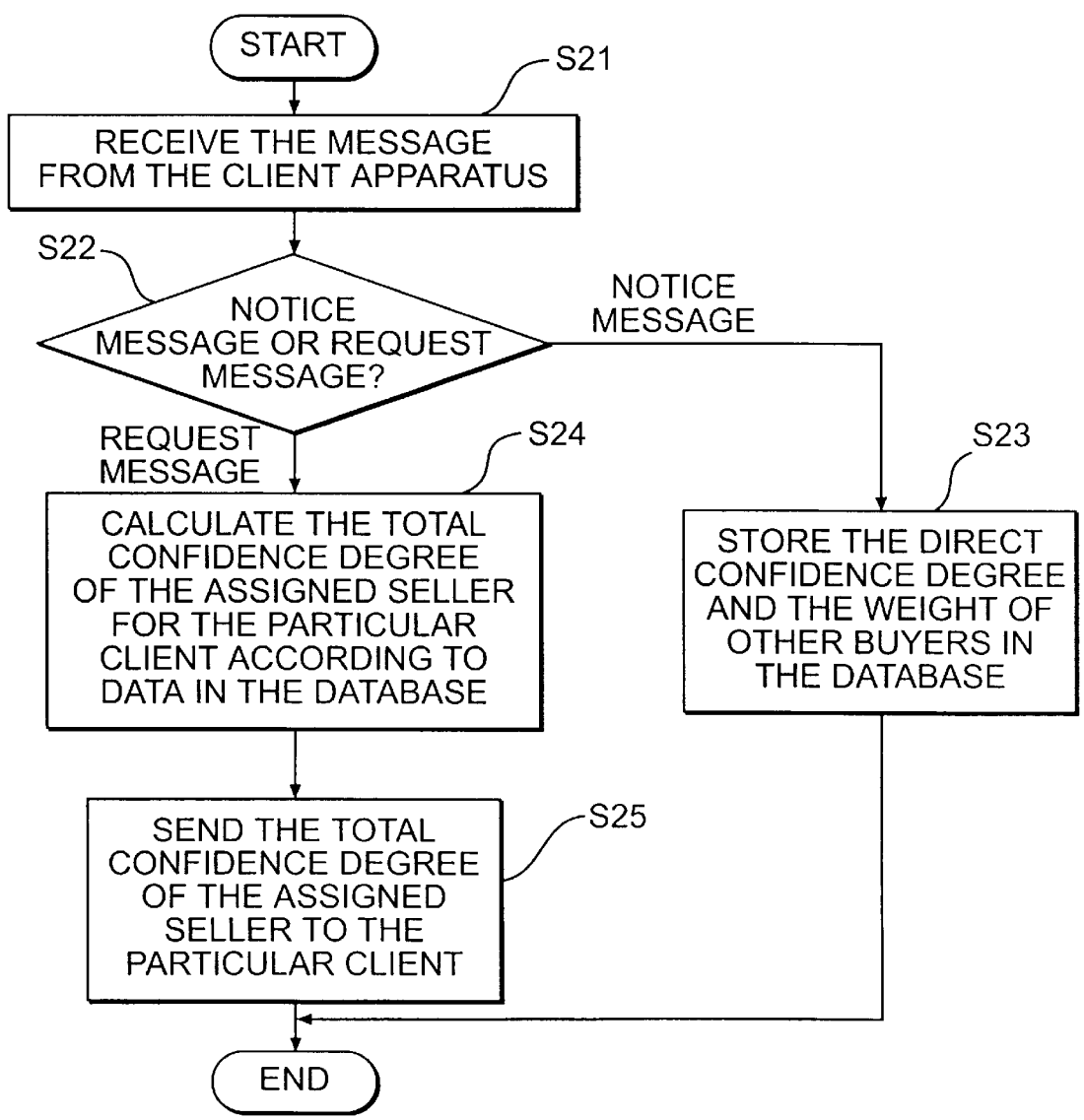

| DESTINATION ADDRESS (PARTICULAR CLIENT) | SOURCE ADDRESS (SERVER) | SELLER ID | DATA OF THE TOTAL CONFIDENCE DEGREE |
|---|---|---|---|

| x\y | A | B | C | D |
|---|---|---|---|---|
| E | 3 | 2 | 1 | 0 |
| F | 2 | 3 | 0 | 1 |
| G | 0 | 2 | 1 | 3 |

| x\z | E | F | G |
|---|---|---|---|
| E | 3 | 2 | 1 |
| F | 1 | 3 | 2 |
| G | 2 | 1 | 3 |

| DESTINATION ADDRESS | SOURCE ADDRESS | SOURCE NODE OF RELAY MESSAGE | DESTINATION NODE OF RELAY MESSAGE | WEIGHT x K |

| DESTINATION ADDRESS | SOURCE ADDRESS | SELLER ID | INTER-MEDIATE RESULT 1 | ~ | SELLER ID | INTER-MEDIATE RESULT n |

FIG. 16A

| ADDRESS F | ADDRESS E | SOURCE NODE E | DESTINATION NODE G | WEIGHT x K |
|---|---|---|---|---|

FIG. 16B

| ADDRESS G | ADDRESS E | SOURCE NODE F | DESTINATION NODE G | WEIGHT x K |
|---|---|---|---|---|

FIG. 16C

| ADDRESS F | ADDRESS E | A | $\alpha_1$ | B | $\alpha_2$ | C | $\alpha_3$ | D | $\alpha_4$ |
|---|---|---|---|---|---|---|---|---|---|

FIG. 16D

| ADDRESS G | ADDRESS F | A | INTERMEDIATE RESULT 1 | B | INTERMEDIATE RESULT 2 | C | INTERMEDIATE RESULT 3 | D | INTERMEDIATE RESULT 4 |
|---|---|---|---|---|---|---|---|---|---|

FIG. 16E

| ADDRESS E | ADDRESS G | A | INTERMEDIATE RESULT 1 | B | INTERMEDIATE RESULT 2 | C | INTERMEDIATE RESULT 3 | D | INTERMEDIATE RESULT 4 |
|---|---|---|---|---|---|---|---|---|---|

6,073,117

MUTUAL CREDIT SERVER APPARATUS AND A DISTRIBUTED MUTUAL CREDIT SYSTEM

FIELD OF THE INVENTION

The present invention relates to a mutual credit server apparatus and a distributed mutual credit system for a buyer to mutually refer a credit of a seller as for trade object by a network.

BACKGROUND OF THE INVENTION

Recently, an internet is widely used and business activity of the internet is concerned. Especially, information transmission through the world is easy for the user by WWW. An activity of public information or propaganda is executed by low cost. Therefore, the user can participate in the business by using the network.

Normally, in a commercial transaction, credit to trade party is regarded as a base. For example, in trade between companies, a contract for cooperation relation is previously made as a commercial custom to limit the trade party. Furthermore, in a personal commercial transaction, a discreditable guest is discriminated by a confidence inquiry of a credit card and a creditable guest is secured by using a guest card. Accordingly, a method how to treat this credit is important in the business of a network society. This credit includes the credit for the buyer and the credit for the seller. The credit for the buyer is a credit for the buyer's payment ability. In same way of the buyer's confidence inquiry for credit card, the confidence inquiry is possible by checking the buyer's payment status in past.

On the other hand, the credit for the seller is a credit for a product or a service of the seller. The buyer actually decides by watching the product in a shop or by obtaining information through mass media. This method is not a problem in case the buyer's selection area is limited. However, in the network society, the commercial area is spread all over the world and the user can personally participate in the business. In short, any user can be the buyer and a number of the buyer greatly increases. Furthermore, in a virtual shop of the network, the user can not actually watch the product. Therefore, a new method to inquiry the seller's confidence is necessary.

As one solution method, a public company can present the credit information of all sellers. However, evaluation of the credit is often different by each public company and standarized evaluation is not always desired for the buyer. As another solution method, a plurality of the buyers can cooperatively exchange the credit information based on past trade result. However, the past trade result is secret between the companies. Therefore, a disclosure of the past trade result includes disadvantage aspect and this solution method is not realistic.

SUMMARY OF THE INVENTION

It is an object of the present invention to provide a mutual credit server apparatus and a distributed mutual credit system for the buyer to obtain the credit information for the seller without directly disclosing the buyer's evaluation for the seller.

According to the present invention, there is provided a mutual credit server apparatus which sends a credit information of a first node apparatus as a seller as for a trade object to a second node apparatus as a buyer, comprising: first memory means for storing a direct confidence degree of each first node apparatus as for each second node apparatus, the direct confidence degree being determined by each second node apparatus based on direct trade history; second memory means for storing a buyer confidence degree of each second node apparatus, the buyer confidence degree being determined by each second node apparatus based on trade information from the other second node apparatus; and processing means for, when a confidence inquiry for a particular first node apparatus is received from a particular second node apparatus, calculating a total confidence degree of the particular first node apparatus as for the particular second node apparatus based on the direct confidence degree of the particular first node apparatus and the buyer confidence degree of each second node apparatus as for the particular second node apparatus.

Further in accordance with the present invention, there is also provided a mutual credit server method for sending a credit information of a first node apparatus as a seller as for a trade object to a second node apparatus as a buyer, comprising steps of: storing a direct confidence degree of each first node apparatus as for each second node apparatus, the direct confidence degree being determined by each second node apparatus based on direct trade history; storing a buyer confidence degree of each second node apparatus, the buyer confidence degree being determined by each second node apparatus based on trade information from the other second node apparatus; and calculating a total confidence degree of a particular first node apparatus as for a particular second node apparatus based on the direct confidence degree of the particular first node apparatus and the buyer confidence degree of each second node apparatus as for the particular second node apparatus, when a confidence inquiry for the particular first node apparatus is received from the particular second node apparatus.

Further in accordance with the present invention, there is also provided a distributed mutual credit system including at least one first node apparatus as a seller and a plurality of second node apparatus as a buyer, the second node apparatus obtains a credit information of the first node apparatus as for trade object, each second node apparatus comprising: means for forming a closed loop orderly consisted of the plurality of second node apparatus from one second node apparatus as a start node to the one second node apparatus as an end node through the other second node apparatus as a relay node in order, if a particular second node apparatus is the one second node apparatus; means for calculating an intermediate result based on fixed information sent by the one second node apparatus and the credit information between the first node apparatus and a particular second node apparatus, if the particular second node apparatus is the other second node apparatus; means for sending the intermediate result to next second node apparatus in the closed loop, if a particular second node apparatus is the other second node apparatus; and means for obtaining the credit information of the first node apparatus by eliminating the fixed information from the intermediate result received through the closed loop, if a particular second node apparatus is the one second node apparatus.

Further in accordance with the present invention, there is also provided a distributed mutual credit method in a system including at least one first node apparatus as a seller and a plurality of second node apparatus as a buyer, the second node apparatus obtains a credit information of the first node apparatus as for trade object, comprising the steps of: forming a closed loop orderly consisted of the plurality of second node apparatus from one second node apparatus as a start node to the one second node apparatus as an end node through the other second node apparatus as a relay node in order, if a particular second node apparatus is the one second node apparatus; calculating an intermediate result based on fixed information sent by the one second node apparatus and the credit information between the first node apparatus and a particular second node apparatus, if the particular second node apparatus is the other second node apparatus; sending the intermediate result to next second node apparatus in the closed loop, if a particular second node apparatus is the other second node apparatus; and obtaining the credit information of the first node apparatus by eliminating the fixed information from the intermediate result received through the closed loop, if a particular second node apparatus is the one second node apparatus.

BRIEF DESCRIPTION OF THE DRAWINGS

FIG. 5 is a schematic diagram of a request message sent from the client apparatus to the server apparatus.

FIG. 6 is a flow chart of processing of the server apparatus according to the first embodiment of the present invention.

FIGS. 16A, 16B, 16C, 16D and 16E are schematic diagrams of concrete examples of the message.

DETAILED DESCRIPTION OF THE PREFERRED EMBODIMENT

Figure 1:
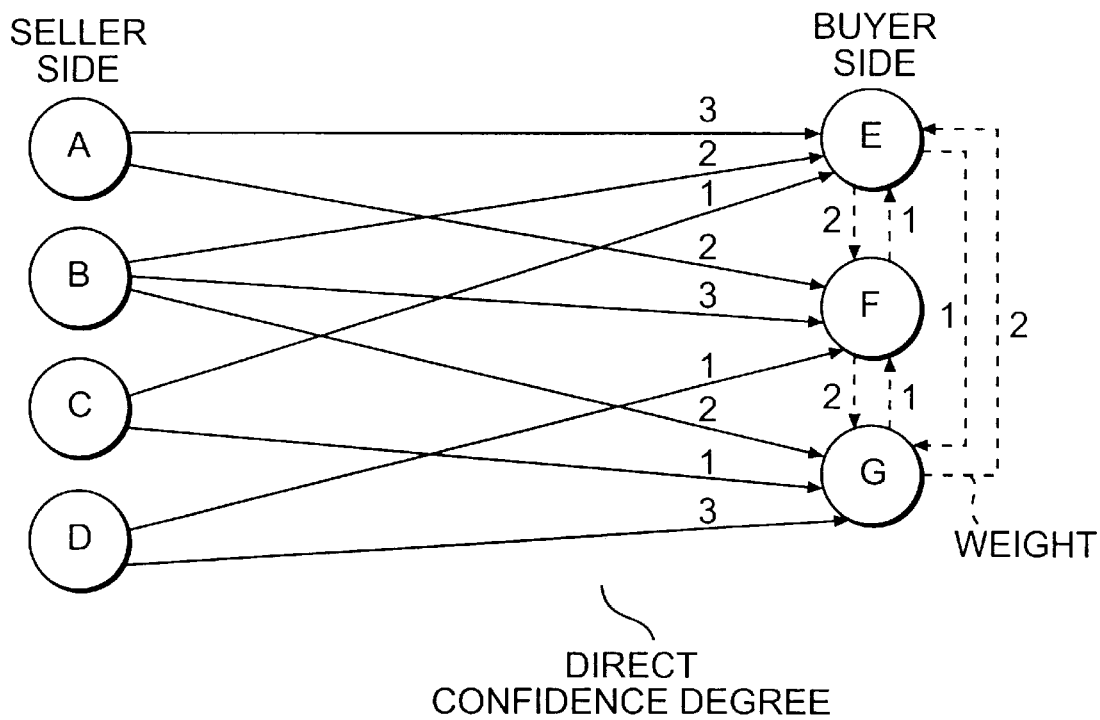
FIG. 1 is a schematic diagram showing relation between the sellers and the buyers.

First, a method to calculate the confidence degree for the seller is explained. Assume that there are a plurality of the sellers and a plurality of the buyers and mutually exchange information of commercial trade by using terminals through a network. For example, the internet business corresponds to the commercial trade. In the first embodiment, a plurality of the buyers form a group for mutual confidence inquiry for the sellers. Each buyer evaluates the credit for the seller based on the history of the commercial trade between the buyer itself and the seller. This evaluation is a direct confidence degree. In addition to this, each buyer evaluates other buyers in the group based on trade information received from the other buyers. This evaluation is a weight as a buyer confidence degree. The buyer respectively multiplies the weight by corresponding direct confidence degree evaluated by the other buyer for the seller. This multiplication result is an indirect confidence degree. The buyer calculates a total confidence degree based on the direct confidence degree and the indirect confidence degree. In this way, each buyer can mutually execute the confidence inquiry for the seller. Furthermore, in the first embodiment, the direct confidence degree and the weight of each buyer is not informed by the other buyer in the group.

In this place, "public confidence degree" is the confidence degree for the seller evaluated by any public company and disclosed in general to smoothly prosecute the network society. This main purpose is that the confidence degree common to all buyers is defined. For example, a disclosure of low public confidence degree includes a function of penal regulations for a crime action on the network. The public confidence degree for the seller y is represented as public (y). In this case, the trade confidence degree is determined by the trade history between the buyer and the seller. For example, the trade history is scale of trade amount or satisfaction degree of the customer. The trade confidence degree is consisted of the direct confidence degree and the indirect confidence degree. The "direct confidence degree" is determined by direct trade history in the past between the buyer itself and the seller. The direct confidence degree between the buyer x and the seller y (for the seller y from a view point of the buyer x) is represented as direct (x, y). The "indirect confidence degree" is independent on the trade between the buyer itself and the seller, which is determined by a third party. The third party is the other buyer in the group. The indirect confidence degree between the buyer x and the seller y through the other buyer z is represented as indirects (x, y). In the first embodiment, indirects (x, y) for the seller y from a view point of the buyer x is calculated as follows.

indirects (x, y)=Σ weight (x, z)×direct (z, y)

z: all other buyers in the group

In this case, weight (x, z) represents the confidence degree for the other buyer z from a view point of the buyer x, which is a weight for direct (z, y) (the direct confidence degree for the seller y from a view point of the other buyer z) from a view point of the buyer x.

Next, in the first embodiment, the total confidence degree is a sum of the public confidence degree and the trade confidence degree. The total confidence degree "credit (x, y)" for the seller y from a view point of the buyer x is calculated as follows.

credit(x,y)=K×public(y)+L×indirects(x,y)+M×direct(x,y)

indirects(x,y)=Σ weight(x,z)×direct(z,y)

K, L, M: constant, z: all other buyers in the group

The above equations are transformed as follows.

credit(x,y)=K×public(y)+L×indirect(x,y)

indirect(x,y)=Σ weight(x,z)×direct(z,y)

K, L: constant, z: all other buyers in the group and the buyer x weight(x,x)=M/L(maximum weight in case of "y=x")

Next, concrete example of calculation of the total confidence degree "credit (x, y)" is explained. As shown in FIG. 1, assume that there are four sellers (A, B, C, D) and three buyers (E, F, G), and "direct (x, y)" and "weight (x, y)" are as follows.

direct(E,A)=3, direct(E,B)=2, direct(E,C)=1, direct(E,D)=0 direct(F,A)=2, direct(F,B)=3, direct(F,C)=0, direct(F,D)=1 direct(G,A)=0, direct(G,B)=2, direct(G,C)=1, direct(G,D)=3 weight(E,E)=3, weight(E,F)=2, weight(E,G)=1 weight(F,E)=1, weight(F,F)=3, weight(F,G)=2 weight(G,E)=2, weight(G,F)=1, weight(G,G)=3

In FIG. 1, a value neighboring a solid line is the direct confidence degree and a value neighboring a dotted line is the weight for the buyer of an end point of an arrow from the buyer of a start point of the arrow. The "indirect (x, y)" is calculated by assigning the above value to a following equation. As a result, the "indirect (E, y)" for the seller y (A~D) from a view point of the buyer E is defined as follows.

|  | via $E$ | via $F$ | via $G$ | total |
|---|---|---|---|---|
| indirect $(E, A)$ = | $3 \times 3$ + | $2 \times 2$ + | $1 \times 0$ = | 13 |
| indirect $(E, B)$ = | $3 \times 2$ + | $2 \times 3$ + | $1 \times 2$ = | 14 |
| indirect $(E, C)$ = | $3 \times 1$ + | $2 \times 0$ + | $1 \times 1$ = | 4 |
| indirect $(E, D)$ = | $3 \times 0$ + | $2 \times 1$ + | $1 \times 3$ = | 5 |

The "indirect (F, y)" for the seller y from a view point of the buyer F is determined as follows.

|  | via $E$ | via $F$ | via $G$ | total |
|---|---|---|---|---|
| indirect $(F, A)$ = | $1 \times 3$ + | $3 \times 2$ + | $2 \times 0$ = | 9 |
| indirect $(F, B)$ = | $1 \times 2$ + | $3 \times 3$ + | $2 \times 2$ = | 15 |
| indirect $(F, C)$ = | $1 \times 1$ + | $3 \times 0$ + | $2 \times 1$ = | 3 |
| indirect $(F, D)$ = | $1 \times 0$ + | $3 \times 1$ + | $2 \times 3$ = | 9 |

The "indirect (G, y) for the seller y from a view point of the buyer G is determined as follows.

|  | via $E$ | via $F$ | via $G$ | total |
|---|---|---|---|---|
| indirect $(G, A)$ = | $2 \times 3$ + | $1 \times 2$ + | $3 \times 0$ = | 8 |
| indirect $(G, B)$ = | $2 \times 2$ + | $1 \times 3$ + | $3 \times 2$ = | 13 |
| indirect $(G, C)$ = | $2 \times 1$ + | $1 \times 0$ + | $3 \times 1$ = | 5 |
| indirect $(G, D)$ = | $2 \times 0$ + | $1 \times 1$ + | $3 \times 3$ = | 10 |

By using above values, total confidence degree "credit (x, y)" is calculated as follows.

credit (x, y)=K×public (y)+L×indirect (x, y)

K=1, L=1

In this case, "public (y)" is defined as follows.

public (A)=5 public (B)=0 public (C)=0 public (D)=2

The "credit (E, y)" for the seller y (A~D) from a view point of the buyer E is determined as follows.

|  | public | indirect | total |
|---|---|---|---|
| credit $(E, A)$ = | 5 + | 13 = | 18 |
| credit $(E, B)$ = | 0 + | 14 = | 14 |
| credit $(E, C)$ = | 0 + | 4 = | 4 |
| credit $(E, D)$ = | 2 + | 5 = | 7 |

The "credit (F, y) for the seller y from a view point of the buyer (F) is determined as follows.

|  | public | indirect | total |
|---|---|---|---|
| credit $(F, A)$ = | 5 + | 9 = | 14 |
| credit $(F, B)$ = | 0 + | 15 = | 15 |
| credit $(F, C)$ = | 0 + | 3 = | 3 |
| credit $(F, D)$ = | 2 + | 9 = | 11 |

The credit (G, y) for the seller y from a view point of the buyer (G) is determined as follows.

|  | public | indirect | total |
|---|---|---|---|
| credit $(G, A)$ = | 5 + | 8 = | 13 |
| credit $(G, B)$ = | 0 + | 13 = | 13 |
| credit $(G, C)$ = | 0 + | 5 = | 5 |
| credit $(G, D)$ = | 2 + | 10 = | 12 |

As a result, the total confidence degree of the seller A is the highest for the buyer E, the total confidence degree of the seller B is the highest for the buyer F, the total confidence degree of the sellers A, B are the highest for the buyer G.

In this place, the direct confidence degree and the weight are secret information for each buyer and must not be disclosed at all. Therefore, in the first embodiment, all data of the direct confidence degree and the weight are safely stored in a public site and the public site only returns the total confidence degree in response to the inquiry from each buyer. In the second embodiment, the direct confidence degree and the weight are stored in each buyer site. The total confidence degree "credit (x, y)" is calculated by relaying an intermediate calculation result between the buyers in the group. In case the buyer X calculates the total confidence degree for the seller y, the buyer X respectively sends the weight (x, y) to each of the other buyer Z in the group. As a start node of the buyer X, indirect (x, y) is orderly calculated by relaying the other buyer Z and lastly returned to the buyer X. In order not to disclose the direct confidence degree and the weight, the buyer X sends a magic number m1 as an initial value of the credit and a multiplication of a magic number m2 with the weight. When the buyer X receives the intermediate result after relaying each of the other buyer Z in the group, the buyer X subtracts m1 from the intermediate result and divides the subtraction result by m2 to obtain the indirect confidence degree.

Figure 2:
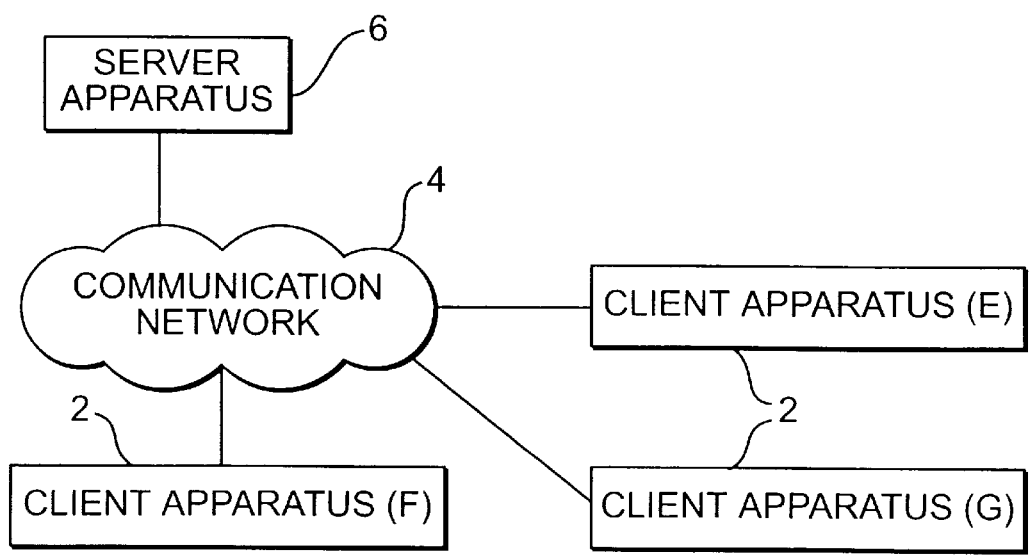
FIG. 2 is a block diagram of the mutual credit system according to a first embodiment of the present invention.
Figures 3, 4:
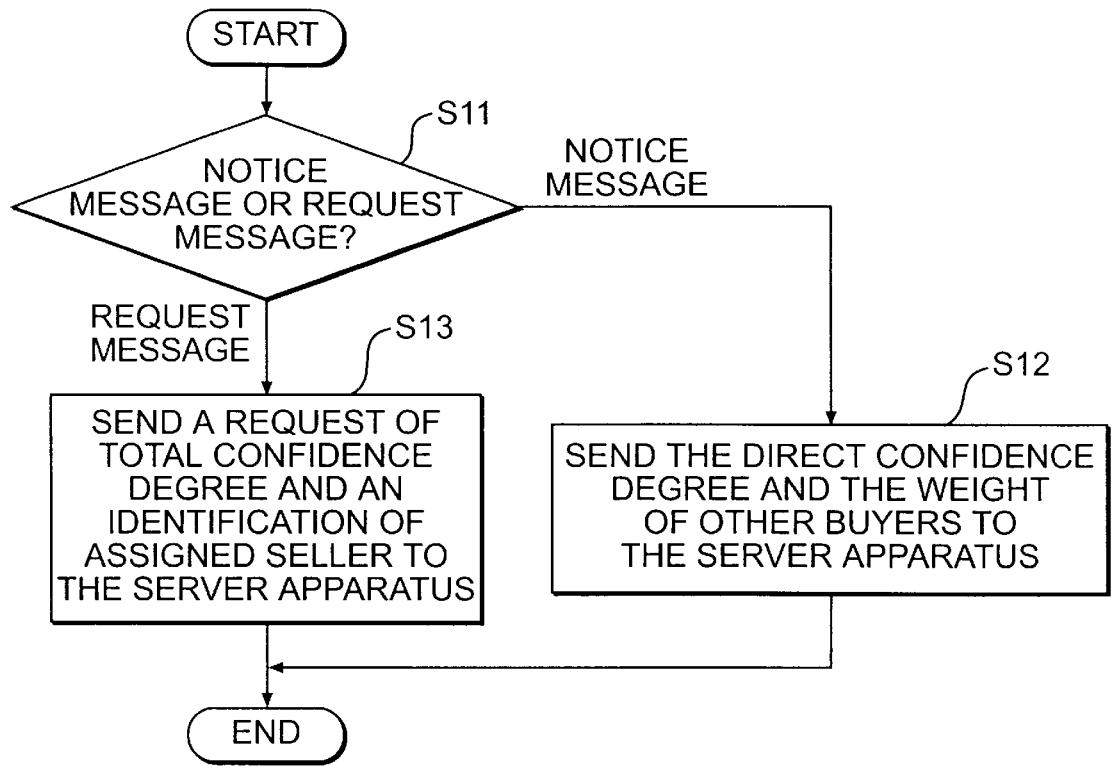
FIG. 3 is a flow chart of processing of a client apparatus according to the first embodiment of the present invention.
FIG. 4 is a schematic diagram of a notice message sent from the client apparatus to a server apparatus.
Figures 7, 8A, 8B, 9:
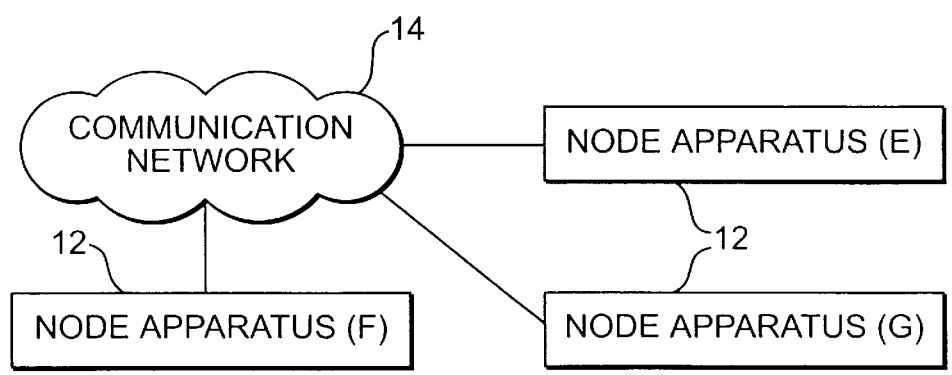
FIG. 7 is a schematic diagram of a reply message sent from the server apparatus to the client apparatus.
FIGS. 8A and 8B are schematic diagrams of content in a data management table.
FIG. 9 is a block diagram of the distributed mutual credit system according to a second embodiment of the present invention.

Next, the mutual credit system according to the first embodiment of the present invention is explained. As mentioned-above, in the first embodiment, all data of the direct confidence degree and the weight are safely stored in the public site (server apparatus). The public site returns the total confidence degree in response to the inquiry from each buyer. FIG. 2 is a block diagram of the mutual credit system of the first embodiment. The mutual credit system includes a plurality of client apparatus 2, a communication network 4 and the server apparatus 6. The client apparatus 2 is a terminal of the buyer side in the group. In FIG. 2, three buyers (client apparatus) E, F, G form one group. The server apparatus 6 corresponds to the public site and located in predetermined public company side. The communication network 4 is same as a network for the commercial trade between the seller and the buyer, but may be another network. For example, this network may be an internet or a wireless network. As a communication between the server apparatus 6 and the client apparatus 2, crypto-communication is desired. In case of sending the data, confirmation whether the opposite is proper is desired. FIG. 3 is a flow chart of processing of the client apparatus of the first embodiment. FIG. 4 is an example of a notice message sent from the client apparatus to the server apparatus. FIG. 5 is an example of a request message sent from the client apparatus to the server apparatus. FIG. 6 is a flow chart of processing of the server apparatus of the first embodiment. FIG. 7 is an example of a reply message sent from the server apparatus to the client apparatus. First, informing of data from each client apparatus to the server apparatus is explained. Each client apparatus 2 as the buyer sends the notice message to the server apparatus 6 at predetermined interval (S12). For example, as shown in FIG. 4, the notice message includes a destination address (the server), a source address (a particular client), a buyer ID of the particular client, a notice code of data and the data itself (the direct confidence degree, the weight). This notice message is sent to the server apparatus 6 through the communication network 4. Assume that ID of the buyer X=X, ID of the buyer Y=Y, ID of the buyer Z=Z, ID of the seller A=A, ID of the seller B=B, ID of the seller C=C, ID of the seller D=D. In FIG. 1, the buyer E (client apparatus 2) sends "3" as direct (X, A), "2" as direct (X, B), "1" as direct (X, C), "0" as direct (X, D), "3" as weight (X, E), "2" as weight (X, F), "1" as weight (X, G). As a format of the data part in the notice message, the data may be arranged in predetermined order or data ID (For example, direct (X, A)=1, weight (X, F)=6) may be added by unit of data. In this case, the change data compared with previous data may be only sent. As the timing of sending, the predetermined timing (For example, once a day or once a week) or the time when the data is changed may be adapted. Furthermore, value of weight (X, X) may be fixed in the server apparatus 6 and not sent from the client apparatus 2 to the server apparatus 6.

On the other hand, the server apparatus 6 receives the message from each client apparatus 2 at any time (S21). If the received message is the notice message (S22), the notice message is stored (S23). In this case, the server apparatus 6 stores the "direct (x, y)" and the "weight (X, z) in a management table shown in FIGS. 8A and 8B. FIG. 8A shows one example of the table of "indirect (x, y)". FIG. 8B shows one example of the table of "weight (x, z)". For example, in FIG. 1, assume that the server apparatus 6 receives "the buyer ID=E, direct (X, A)=3, direct (X, B)=2, direct (X, C)=1, direct (X, D)=0, weight (X, E)=3, weight (X, F)=2, weight (X, G)=1" from the buyer E. Assume that the server apparatus 6 receives "the buyer ID=F, direct (X, A)=2, direct (X, B)=3, direct (X, C)=0, direct (X, D)=1, weight (X, E)=1, weight (X, F)=3, weight (X, G)=2" from the buyer F. Assume that the server apparatus 6 receives "the buyer ID=G, direct (X, A)=0, direct (X, B)=2, direct (X, C)=1, direct (X, D)=3, weight (X, E)=2, weight (X, F)=1, weight (X, G)=3" from the buyer G. In this case, the management table stores the direct (x, y) as shown in FIG. 8A and the weight (x, z) as shown in FIG. 8B. The server apparatus 6 includes another table to store the public confidence degree (publik (y)) for each seller y. In case the "publik (k)" is updated, the corresponding public confidence degree is updated in the table. In this case, the server apparatus 6 stores the direct confidence degree and the weight in unaccessible memory in order not to be obtained by out side of the network. These data may be cryptographed in the unaccessible memory.

Next, the confidence inquiry from the client apparatus to the server apparatus 6 and the reply from the server apparatus to the client apparatus are explained. Each client apparatus 2 (each buyer in the group) sends the request message as the confidence inquiry to the server apparatus 6 at predetermined timing (S13). For example, as shown in FIG. 5, the request message includes a destination address (the server apparatus), a source address (a particular client), a buyer ID (the particular client ID), a request code of total confidence degree, a seller ID of the inquiry (one seller or plural sellers). This request message is sent to the server apparatus 6 through the communication network 4. For example, in FIG. 1, the buyer E requests the total confidence degree of the sellers A, B, C, D. On the other hand, when the server apparatus 6 receives the request message (S22), the server apparatus 6 calculates the total confidence degree "credit (x, y)" for the seller y from a view point of the buyer X and sends the total confidence degree as the reply message to the client apparatus of the buyer ID. For example, as shown in FIG. 7, the reply message includes a destination address (the particular client as the buyer ID), a source address (the server apparatus), the seller ID of the inquiry, data of the total confidence degree. The reply message is sent to the server apparatus 6 through the communication network 4. For example, assume that the management table stores the direct confidence degree and the weight as shown in FIGS. 8A and 8B. The server apparatus 6 sends (seller ID=A, credit=18) (seller ID=B, credit=14) (seller ID=C, credit=4) (seller ID=D, credit=7) as the reply message to the client apparatus 2 of the buyer E.

In the above example, the request message respectively includes the seller ID of the confidence inquiry. In this case, if the total confidence degree for all sellers is requested, the purport code as the seller ID (For example, the seller ID=ALL) may be included in the request message. Furthermore, in the above example, the request message respectively includes the buyer ID as the source address. However, the buyer ID may be not written in the request message and the server apparatus 2 may always sent the total confidence degree "credit" of all sellers to all buyers. In this case, the total confidence degree "credit" may be arranged in predetermined order of sellers in the reply message. As mentioned-above, in the first embodiment, the confidence degree for the seller based on the secret information of the buyer is calculated without disclosing the secret information to other buyers. Therefore, the first embodiment distributes to wholesome development of the network business.

Next, the distributed mutual credit system of the second embodiment is explained. As mentioned-above, in the present invention, each buyer stores the direct confidence degree and the weight in a self-site (each particular buyer site). One buyer as the source address is regarded as a start point node and an end point node. The one buyer and other buyers in the group orderly form a closed loop. The one buyer as the start point node sends the magic number as the intermediate result for a seller or plural sellers to next other buyer in the closed loop. The intermediate result is orderly relaid between the buyers in the closed loop whenever each buyer updates the intermediate result. In this way, the one buyer as the end point node receives the updated intermediate result as the indirect confidence degree after relaying through the closed loop.

FIG. 9 is a block diagram of the distributed mutual credit system according to the second embodiment. The distributed mutual credit system includes a plurality of node apparatus 12 and the communication network 14. The node apparatus 12 is the terminal of the buyer in the group. In FIG. 9, the buyers E, F, G form one group. Three node apparatuses 12 respectively correspond to the buyers E, F, G. The communication network 14 is a network to communicate between the seller and the buyer for commercial trade, but may be another network. For example, the communication network 14 may be the internet or a wireless network. As for communication between the node apparatuses 12, crypto communication is desired. As for sending data, confirmation whether communication opposite is proper is necessary.

Figure 10A:
FIGS. 10A and 10B are schematic diagrams of first example of content in the data management table.
Figure 10B:
Figure 11A:
FIGS. 11A and 11B are schematic diagrams of second example of content in the data management table.
Figure 11B:
Figure 12A:
FIGS. 12A and 12B are schematic diagrams of third example of content in the data management table.
Figure 12B:

In the second embodiment, the direct confidence degree "direct (x, y)" and the weight coefficient "weight (x, z)" are stored in the site of the buyer X and not referred by the other buyer's site in the group. Each node apparatus 12 stores its own direct (x, y) and weight (x, z) in unaccessible memory in order not to be obtained by outside of the network. The each node apparatus updates these data at predetermined interval (for example, once a day or once a week) or at any time. FIGS. 10A and 10B show "direct (E, y)" and "weight (E,z)" stored in the node apparatus 12 of the buyer E. FIGS. 11A and 11B show "direct (F, y)" and weight (F,z)" stored in the node apparatus 12 of the buyer F. FIGS. 12A and 12B show "direct (G, y)" and "weight (G, z)" stored in the node apparatus 12 of the buyer G. The values of each table in FIGS. 10~12 correspond to the values of each table in FIG. 8 of the first embodiment.

Figure 13A:
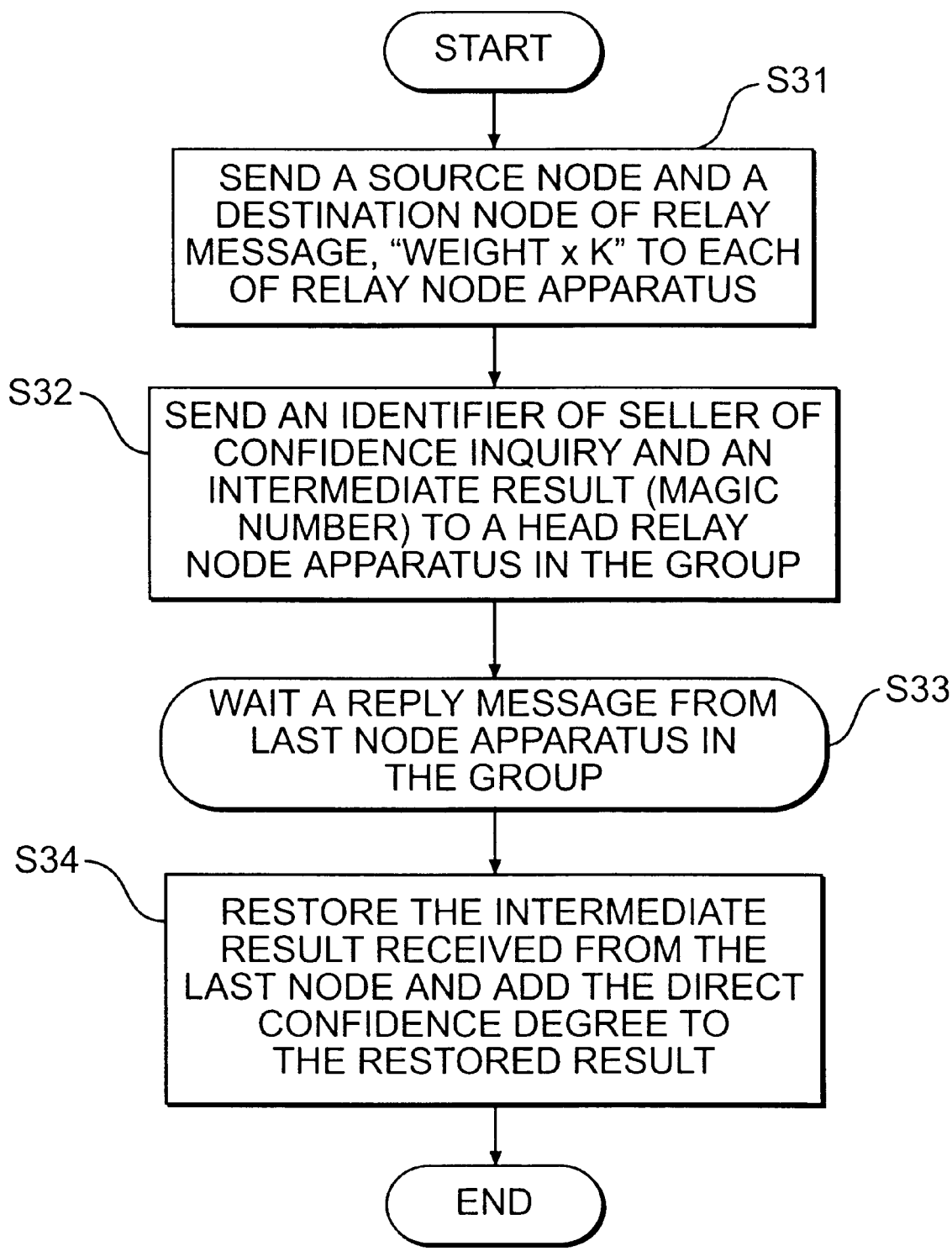
FIG. 13A is a flow chart of processing of a source node apparatus according to the second embodiment of the present invention.
Figure 13B:
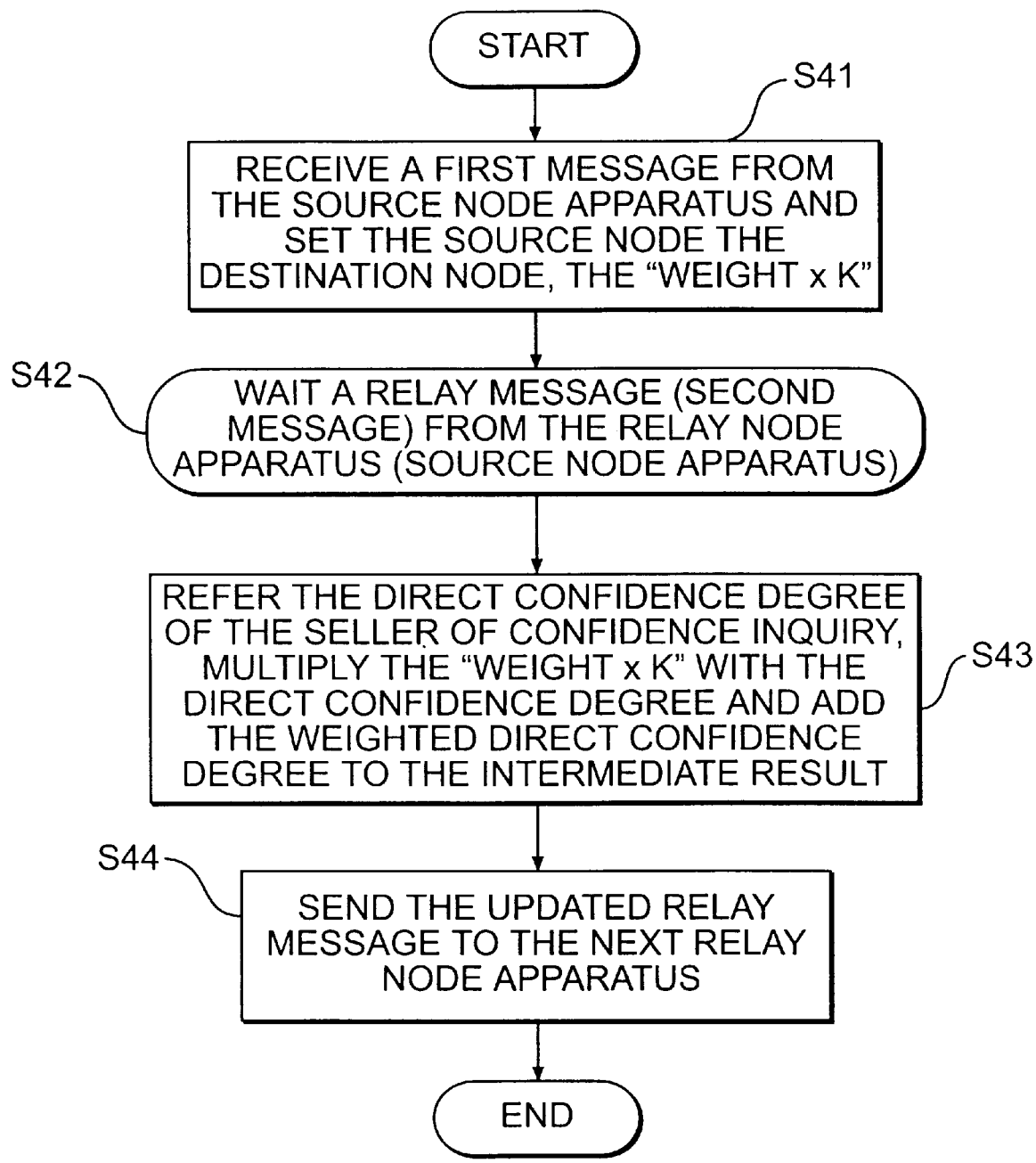
FIG. 13B is a flow chart of processing of a relay node apparatus except for the source node apparatus in group members according to the second embodiment of the present invention.
Figures 14A, 14B, 15:
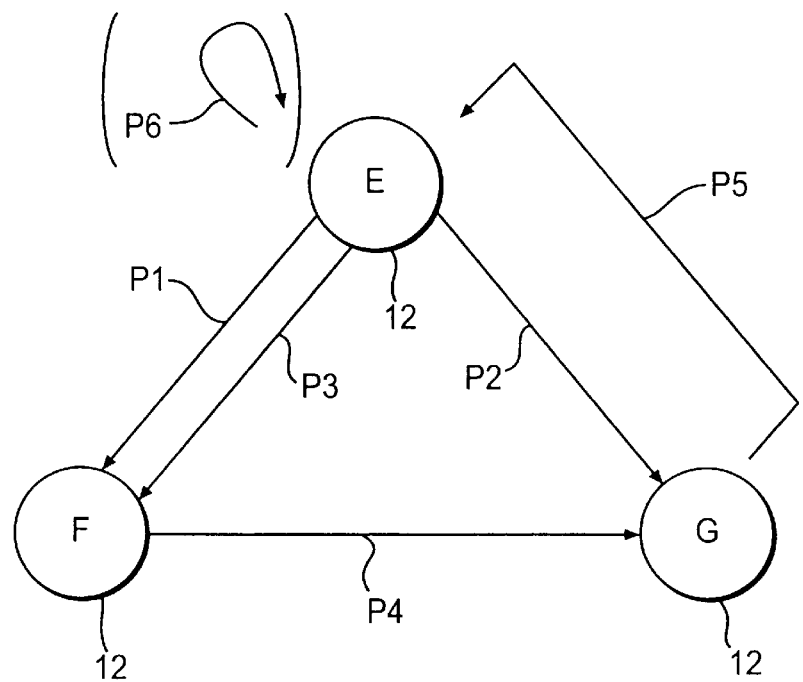
FIG. 14A is a schematic diagram of a message sent from the source node apparatus to the relay node apparatus.
FIG. 14B is a schematic diagram of a message transmitted between the node apparatus.
FIG. 15 is a schematic diagram of concrete example of a flow of the message among the node apparatus.

Next, processing of each node apparatus 12 in the second embodiment is explained. As shown is FIG. 15, assume that one node apparatus E becomes a source node and a client node, and three node apparatuses E, F, G form one closed loop (message relay loop). FIG. 13A is a flow chart of processing of the source node apparatus (the one node apparatus E in FIG. 15). FIG. 13B is a flow chart of processing of the other node apparatus (relay node apparatus F, G in FIG. 15). First, the source node apparatus sends first message including a source node (previous node apparatus), a destination node (next node apparatus), "weight (x, z)×K" to all of the relay node apparatus (S31). As for the source node and the destination node address, an identifier of the node apparatus may be used. FIG. 14A shows content of the first message sent from the source node apparatus to the relay node apparatus. In FIG. 14A, "destination address" is an address of the relay node apparatus to which the first message is sent, "source address" is an address of the source node apparatus which sends the first message, source node of relay message" is an address of the previous node for the relay node to receive the relay message, destination node of relay message" is an address of the next node for the relay node to send the relay message. The magic number "K" is not known by all of the relay node apparatus (the buyer Z) except for the source node apparatus (the buyer X). The buyer Z can not know "weight (x, z)" because the buyer Z receives "weight (x, z)×K" from the buyer X. In short, the buyer Z can not know the buyer confidence degree for the buyer Z itself from a view point of the buyer X.

Next, the source node apparatus sends second message including an identifier (ID) of the seller of the confidence inquiry and the intermediate result (magic number a i) as an initial value to a head relay node apparatus of the loop (s32). FIG. 14B showns the content of the second message sent from the source node apparatus to the relay node apparatus, which is same as the relay message transmitted between the relay node apparatuses. In FIG. 14B, the intermediate result i (magic number α i as the initial value) is set by unit of the seller ID and the magic number α i as the initial value is not known by the buyer Z of the relay node apparatus except for the buyer X of the source node apparatus. Next, the source node apparatus waits the relay message from a last relay node apparatus of the loop (S33).

On the other hand, each of the relay node apparatus receives the first message and stores the source node and the destination node of the relay message and "weight×K" (S41). Next, each relay node apparatus waits the relay message sent from the previous relay node apparatus (S42). In this case, the head relay node apparatus waits the second message sent from the source node apparatus. When the relay node apparatus receives the relay message shown in FIG. 14B, the relay node apparatus retrieves the direct confidence degree "direct (z, y)" of the seller ID stored in its own site, multiplies "weight×K" by the direct confidence degree "direct (z, y)", and adds the multiplication result to the intermediate result of the seller ID in the relay message (S43). The relay node apparatus sends the relay message in which the intermediate result is updated to the next relay node apparatus (S44). As a result, the intermediate result of the seller i in the relay message sent from the last node apparatus is "Σ weight (x, z)×K×direct (z, y)+α i indirects (x, y)×K+α i".

When the source node apparatus receives the relay message from the last relay node apparatus, the source node apparatus subtracts the magic number α i from the intermediate result in the relay message and divides the subtraction result by the magic number K. In short, the indirect confidence degree "indirects (x, y)" is restored by eliminating effect of the magic number from the intermediate result. The source node apparatus multiplies the "weight (x, x)" by the direct confidence degree "direct (x, y)" of itself, and adds this multiplication result to the "indirects (x, y)" to calculate "indirect (x, y)" in a wide sense. Then, the source node apparatus calculates the total confidence degree "credit (x, y)" by adding the public confidence degree "publik (y)" as follows (S34).

credit(x, y)=K×public(y)+L×indirect(x, y)

In this way, the source node apparatus calculates the total confidence degree "credit (x, y)" by using a function of the magic number K, α i. In addition to this, each of the relay node apparatus can not extract the direct confidence degree determined by other relay node apparatus and the weight determined by the source node apparatus from the relay message because of the function of the magic number K, α i. Therefore, the total confidence degree of predetermined seller is determined without disclosing secret information of each buyer.

Next, concrete example of the second embodiment is explained. In this example, in same way of the first embodiment, assume that three buyers E, F, G form one group as for four sellers A, B, C, D, and a node apparatus of the buyer E is the source node apparatus. FIG. 15 shows a flow of the message among the buyers E, F, G. First, the source node apparatus (the buyer E) sends the first message (source node=E, destination node G, weight "weight (E, F)×K") to the relay node apparatus (the buyer F) (p1 in FIG. 15). In same way, the source node apparatus (the buyer E) sends the first message (source node=F, destination node=E, weight="weight (E, G)×K") to the relay node apparatus (the buyer G) (p2 in FIG. 15). FIG. 16A shows the first message sent from the buyer E to the buyer F and FIG. 16B shows the first message sent from the buyer E to the buyer G. As mentioned-above, "K" is magic number and not known by other buyers except for the buyer E. Accordingly, the buyer F can not know "weight (E, F)" and the buyer G can not know "weight (E, G)". Next, the source node apparatus (the buyer E) sends the second message including the intermediate result as the initial value (magic number ($\alpha$ 1, $\alpha$ 2, $\alpha$ 3, $\alpha$ 4)) to the relay node apparatus (the buyer F) (p3 in FIG. 15). The magic number ($\alpha$ 1, $\alpha$ 2, $\alpha$ 3, $\alpha$ 4) are not known by the other buyers F, G except for the buyer E. FIG. 16C shows the second message sent from the buyer E to the buyer F. In this place, assume that the intermediate result for the seller A is RA, the intermediate result for the seller B is RB, the intermediate result for the seller C is RC, the intermediate result for the seller D is RD. Next, the relay node apparatus (the buyer F) multiplies "weight (E, F)×K" by "direct (F, y)" of itself, adds the multiplication result to the intermediate result in the second message and sends this relay message to the relay node apparatus (the buyer G) (p4 in FIG. 15). FIG. 16D shows the relay message sent from the buyer F to the buyer G. In this case, the intermediate result of the sellers A, B, C, D sent from the buyer F is represented as follows.

RA=weight(E,F)×k×direct(F,A)+$\alpha$ 1
RB=weight(E,F)×k×direct(F,B)+$\alpha$ 2
RC=weight(E,F)×k×direct(F,C)+$\alpha$ 3
RD=weight(E,F)×k×direct(F,D)+$\alpha$ 4

Next, the relay node apparatus (the buyer G) multiplies "weight (E, G)×K" with "direct (G, y)" of itself, adds the multiplication result to the intermediate result in the relay message and sends this relay message to the source node apparatus (the buyer E) (p5 in FIG. 15). FIG. 16E shows the relay message sent from the buyer G to the buyer E. In this case, the intermediate result of the sellers A, B, C, D sent from the buyer G is represented as follows.

RA=weight(E,G)×k×direct(G,A)+weight(E,F)×k×direct(F,A)+$\alpha$ 1
RB=weight(E,G)×k×direct(G,B)+weight(E,F)×k×direct(F,B)+$\alpha$ 2
RC=weight(E,G)×k×direct(G,C)+weight(E,F)×k×direct(F,C)+$\alpha$ 3
RD=weight(E,G)×k×direct(G,D)+weight(E,F)×k×direct(F,D)+$\alpha$ 4

Next, the source node apparatus (the buyer E) eliminates the effect of the magic number from the intermediate result in the relay message sent from the relay node apparatus (the buyer G) to calculate "indirect (E, y)". Then, the source node apparatus (the buyer E) multiplies "weight (E, E)" by "direct (E, y)" of itself and adds the multiplication result to "indirects (E, y)" to calculate "indirects (E, y) in a wide sense as follows.

indirect(E,A)=((RA−$\alpha$ 1)/k)+weight(E,E)×direct(E,A)
indirect(E,B)=((RB−$\alpha$ 2)/k)+weight(E,E)×direct(E,B)
indirect(E,C)=((RC−$\alpha$ 3)/k)+weight(E,E)×direct(E,C)
indirect(E,D)=((RD−$\alpha$ 4)/k)+weight(E,E)×direct(E,D)

Then, the source node apparatus (the buyer E) calculates the total confidence degree "credit (x, y)" for each seller y based on "indirect (E, y)" and the public confidence degree "publik" as follows.

credit(E,A)=K×publik(E)+L×indirect(E,A)
credit(E,B)=K×publik(E)+L×indirect(E,B)
credit(E,C)=K×publik(E)+L×indirect(E,C)
credit(E,D)=K×publik(E)+L×indirect(E,D)

In FIG. 15, one relay loop is formed for the one source node apparatus (the buyer E) as the start node and the end node. However, a plurality of the relay loop may be formed for the one source node apparatus as the start node and the end node. In this case, at least two relay node apparatus are included in each relay loop and each relay node apparatus is belonged to only one relay loop. In comparison with forming of one relay loop, the different point of forming of a plurality of relay loop is that, the source node apparatus executes steps S31 and S32 in FIG. 13A for each relay loop, calculates sum of the intermediate result of same seller in all relay messages sent from each last relay node apparatus of each relay loop, and respectively eliminates the effect of the magic number corresponding to the relay loop from each sum. The sum of the intermediate result is equal to the intermediate result in the relay message sent from the last node apparatus in case of forming of one relay loop. The processing of the relay node apparatus is same as the flow chart of FIG. 13B.

In the first and second embodiments, data of "direct" and "weight" are concentrically managed in the server apparatus (the first embodiment) or distributively managed in each node apparatus (the second embodiment). In addition to this, update history of data (for example, a pair of the update time and updated data, or content of all data at predetermined timing) is reserved. If necessary, change data of the total confidence degree in proportion to time may be calculated and supplied to the source node apparatus.

As for addition or deletion of the buyer or the seller, the server apparatus manages this change in the first embodiment. In the second embodiment, for example, the node apparatus which exists both before and after member change (buyer change) informs the addition or deletion to other member (buyer) in the group.

In case of the addition or deletion of member in the first embodiment, the server apparatus changes the "direct" and "weight" in its own table. Especially, in case of the addition of member, the existing client apparatus informs "weight" of added member to the server apparatus.

In case of the addition or the deletion of the seller in the first embodiment, the server apparatus changes "direct" for the seller in its own table.

In case of the addition or the deletion of the member (buyer) in the second embodiment, the existing node apparatus changes "weight" in its own table. In case of the addition of the member, "weight" corresponding to added member is newly set in each node apparatus.

In case of the addition or the deletion of the seller in the second embodiment, each node apparatus changes "direct" for the seller in its own table. In case of the addition of the seller, "direct" corresponding to added seller is newly set in each node apparatus.

In case of the addition or the deletion of the member (buyer) in the first and second embodiments, the constants K, L for calculation of the total confidence degree is corrected if necessary. For example, if the constant L is used for normalization of "indirect", the constant L is increased or decreased in proportion to number of member in the group.

A memory can be used to store instructions for performing the process described above, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A mutual credit server apparatus for sending credit information about at least one seller to an inquiring buyer computer, wherein an inquiring buyer is one of a plurality of buyers each having a buyer computer, said server comprising:

first memory means for storing a direct confidence degree about the at least one seller from a point of view of each of the plurality of buyers, the direct confidence degree being determined by each buyer based on direct trade history between each buyer and the seller;

second memory means for storing a buyer confidence degree about each of the other buyers from a view point of each buyer, the buyer confidence degree being determined by each buyer based on trade information from the other buyers;

processing means for, when a confidence inquiry about the seller is received from the inquiring buyer computer, calculating a total confidence degree about the seller from a viewpoint of the inquiring buyer based on the direct confidence degree about the seller from a viewpoint of the each buyer and the buyer confidence degree about each of the other buyers from a viewpoint of the inquiring buyer.

2. The mutual credit server apparatus according to claim 1, wherein the direct confidence degree about the at least one seller from a viewpoint of the buyer and the buyer confidence degree about each of the other buyers from a viewpoint of the buyer are received at the mutual credit server as a notice message from the buyer computer of the buyer, wherein said first memory means stores each direct confidence degree as a credit value between each buyer and the at least one seller, and wherein said second memory means stores each buyer confidence degree as a credit value between each buyer and each other buyer.

3. The mutual credit server apparatus according to claim 1, wherein said processing means respectively multiplies the direct confidence degree about the seller from a viewpoint of each of the buyers by the buyer confidence degree about each of the other buyers from a viewpoint of the inquiring buyer, and calculates a sum of the multiplication results to determine an indirect confidence degree about the seller from a viewpoint of the inquiring buyer.

4. The mutual credit server apparatus according to claim 3, wherein said processing means adds the indirect confidence degree to the direct confidence degree about the seller from a viewpoint of the inquiring buyer to calculate the total confidence degree about the seller from a viewpoint of the inquiring buyer.

5. The mutual credit server apparatus according to claim 4, wherein said processing means adds the total confidence degree to a public confidence degree about the seller to calculate the credit information about the seller.

6. The mutual credit server apparatus according to claim 5, further comprising a sending means for sending the credit information to the inquiring buyer as a reply message.

7. A mutual credit server method for sending for sending credit information about at least one seller to an inquiring buyer computer, wherein an inquiring buyer is one of a plurality of buyers each having a buyer computer, said method comprising the steps of:

storing a direct confidence degree about the at least one seller from a viewpoint of each of the plurality of buyers, the direct confidence degree being determined by each buyer based on direct trade history with the seller;

storing a buyer confidence degree about each of the other buyers from a viewpoint of each buyer, the buyer confidence degree being determined by each buyer based on trade information from each of the other buyers; and calculating a total confidence degree about the seller from a viewpoint of the inquiring buyer based on the direct confidence degree about the seller from a viewpoint of each buyer and the buyer confidence degree about each of the other buyers from a viewpoint of the inquiring buyer in response to a confidence inquiry about the seller from the inquiring buyer computer.

8. A distributed mutual credit system for obtaining credit information about at least one seller, the system comprising:

a plurality of buyer computers for each of a plurality of buyers, wherein any one, of the buyer computers becomes an inquiring buyer computer upon requesting credit information about a seller and the remainder of the buyer computers become relay buyer computers;

wherein the inquiring buyer computer comprises
  means for forming a closed loop of buyer computers starting and ending at the inquiring buyer computer and passing through each relay buyer computer in order; and
  means for sending to each relay computer a weight based on a buyer confidence degree about each relay buyer from a viewpoint of the inquiring buyer and for sending an intermediate result as an initial value to a next buyer computer in the closed loop,
  means for receiving from a last buyer computer in the closed loop an updated intermediate result, and
  means for obtaining an eliminated result by eliminating the initial value from the updated intermediate result, and for obtaining the credit information about the seller from a viewpoint of the inquiring buyer by adding the eliminated result to a direct confidence degree about the seller from a viewpoint of the inquiring buyer; and wherein each relay buyer computer comprises
  means for receiving an intermediate result from a previous buyer computer in the closed loop,
  means for updating the intermediate result based on the weight and a direct confidence degree about the seller from a viewpoint of the relay buyer, and
  means for sending the updated intermediate result to a next buyer computer in the closed loop.

9. The distributed mutual credit system according to claim 8, wherein the inquiring buyer computer further comprising a memory means for storing the direct confidence degree about the seller from a viewpoint of the inquiring buyer and a buyer confidence degree about each relay buyer from a viewpoint of the inquiring buyer.

10. The distributed mutual credit system according to claim 9, wherein the inquiring buyer computer further comprising a first processing means for sending a message to each of the relay buyer computers in the loop, the message including address information of a source buyer computer as the previous buyer computer in the closed loop address information of a destination buyer computer as the next buyer computer in the closed loop and the weight comprising a fixed number multiplied by the buyer confidence degree about the relay buyer computer from a viewpoint of the inquiring buyer.

11. The distributed mutual credit system according to claim 10, wherein the inquiring buyer computer further comprising a second processing means for sending an identification information of the seller and the intermediate result as an initial value to a next relay buyer computer in the closed loop.

12. The distributed mutual credit system according to claim 11, wherein each relay buyer computer further comprising a third processing means for receiving the weight, the identification information of the seller and an intermediate result from the previous buyer computer in the closed loop, for multiplying the weight by the direct confidence degree about the seller from a viewpoint of the relay buyer, the seller identified by the identification information, and for producing the updated intermediate result by adding the multiplication result to the received intermediate result.

13. The distributed mutual credit system according to claim 12, wherein the inquiring buyer computer further comprising a fourth processing means for subtracting the initial value from the updated intermediate result received from the last relay buyer computer in the closed loop, and for dividing the subtraction result by the fixed number to calculate an indirect confidence degree about the seller from a viewpoint of the inquiring buyer.

14. The distributed mutual credit system according to claim 13, wherein the fourth processing means adds the indirect confidence degree to the direct confidence degree about the seller from a viewpoint of the inquiring buyer to calculate a total confidence degree about the seller from a viewpoint of the inquiring buyer.

15. A method of obtaining credit information about at least one seller in a distributed mutual credit system including a plurality of buyer computers for each of a plurality of buyers, wherein one buyer computer requests the credit information about the seller, thereby becoming an inquiring buyer computer, the method comprising the steps of:

a) forming a closed loop orderly comprising the plurality of buyer computers, wherein the inquiring computer is a beginning and an end of the closed loop and the other buyer computers are relay computers;

b) sending a weight based on a buyer confidence degree about each relay buyer from a viewpoint of the inquiring buyer to corresponding relay buyer computers;

c) sending an intermediate result as an initial value at the inquiring buyer computer to a relay buyer computer immediately succeeding the inquiring buyer computer in the closed loop;

d) updating the intermediate result based on the weight and a direct confidence degree about the seller from a viewpoint of the relay buyer and the relay computer in the closed loop;

e) sending the updated intermediate result to a next relay buyer computer in the closed loop;

f) repeating steps d) and e) until the inquiring computer receives a final intermediate result from a relay buyer computer immediately preceding the inquiring buyer computer in the closed loop;

g) calculating an eliminated result by eliminating the initial value from the final intermediate result; and h) obtaining the credit information about the seller from a viewpoint of the inquiring buyer by adding the eliminated result to a direct confidence degree about the seller from a viewpoint of the inquiring buyer.

* * * * *

UNITED STATES PATENT AND TRADEMARK OFFICE
CERTIFICATE OF CORRECTION

PATENT NO. : 6,073,117
DATED : June 6, 2000
INVENTOR(S) : Shigeru OYANAGI et al.

It is certified that error appears in the above-indentified patent and that said Letters Patent is hereby corrected as shown below:

Claim 7, Col. 13, line 65, delete "for sending" (second occurrence).

Claim 8, Col. 14, line 23, after "any one", delete ",".

Claim 10, Col. 15, line 1, after "loop", insert --,--.

Signed and Sealed this

Tenth Day of April, 2001

Attest:

NICHOLAS P. GODICI

Attesting Officer    Acting Director of the United States Patent and Trademark Office